(12) United States Patent
Yang et al.

(10) Patent No.: US 10,486,544 B2
(45) Date of Patent: Nov. 26, 2019

(54) ELECTROMAGNETIC LEVITATION FORCE TYPE PROPULSION DEVICE

(71) Applicants: GUANGZHOU MICRO WELDING EQUIPMENT CO., LTD., Guangzhou, Guangdong (CN); Cheng Yang, Guangdong (CN)

(72) Inventors: Cheng Yang, Guangzhou (CN); Shitong Yang, Guangzhou (CN)

(73) Assignees: Guangzhou Micro Welding Equipment Co., Ltd., Guangzhou (CN); Cheng Yang, Guangzhou (CN)

( * ) Notice: Subject to any disclaimer, the term of this patent is extended or adjusted under 35 U.S.C. 154(b) by 1023 days.

(21) Appl. No.: 14/684,455

(22) Filed: Apr. 13, 2015

(65) Prior Publication Data

US 2015/0251562 A1     Sep. 10, 2015

Related U.S. Application Data

(63) Continuation of application No. PCT/CN2013/078961, filed on Jul. 7, 2013.

(30) Foreign Application Priority Data

Oct. 13, 2012   (CN) .......................... 2012 1 0386412
May 24, 2013   (CN) .......................... 2013 1 0200164

(51) Int. Cl.
    *B60L 13/10*         (2006.01)
    *B23K 11/36*        (2006.01)
              (Continued)

(52) U.S. Cl.
    CPC .............. *B60L 13/10* (2013.01); *B23K 11/36* (2013.01); *F16D 63/002* (2013.01); *F41B 6/00* (2013.01)

(58) Field of Classification Search
    CPC ........ B23K 11/31; B23K 11/36; B60K 31/00; B60L 13/10; F16D 63/002; H02K 33/00; H02K 41/00; F41B 6/00
              (Continued)

(56) References Cited

FOREIGN PATENT DOCUMENTS

| CN | 101670480 A | 3/2010 |
|---|---|---|
| CN | 102158141 A | 8/2011 |

OTHER PUBLICATIONS

Machine Translation of CN 102158141 A, Cheng Liu, Aug. 17, 2011, pp. 1-6.*

(Continued)

*Primary Examiner* — Dana Ross
*Assistant Examiner* — James F Sims, III

(57) ABSTRACT

An electromagnetic levitation force type propulsion device includes an integrated electromagnet structure, an auxiliary propulsion structure and a power supply control structure. The integrated electromagnet structure includes a mounting frame, a propulsion outputting shaft capable of moving back and forth relative to the mounting frame and extending out of the mounting frame, and two electromagnets opposite to each other. One of the electromagnets is assembled to the mounting frame to form a stationary electromagnet and the other electromagnet is fastened to the propulsion outputting shaft to form a movable electromagnet. The movable electromagnet is provided at the other side of the mounting frame and can move back and forth relative to the stationary electromagnet. The auxiliary propulsion structure drives the movable electromagnet back and forth relative to the stationary electromagnet. The power supply control structure provides a power supply for the integrated electromagnet structure and/or the auxiliary propulsion structure.

9 Claims, 4 Drawing Sheets

(51) Int. Cl.
*F16D 63/00* (2006.01)
*F41B 6/00* (2006.01)

(58) Field of Classification Search
USPC ............ 219/78.01; 188/164; 124/3; 104/286
See application file for complete search history.

(56) References Cited

OTHER PUBLICATIONS

International Search Report of PCT Patent Application No. PCT/CN2013/078961 dated Oct. 10, 2013.

\* cited by examiner

ELECTROMAGNETIC LEVITATION FORCE TYPE PROPULSION DEVICE

CROSS-REFERENCE TO RELATED APPLICATIONS

The present application is a Continuation application of PCT application No. PCT/CN2013/078961 filed on Jul. 7, 2013, which claims the benefit of Chinese Patent Application Nos. 201210386412.4 filed on Oct. 13, 2012 and 201310200164.4 filed on May 24, 2013. All the above are hereby incorporated by reference.

TECHNICAL FIELD

The present invention generally relates to propulsion devices and, more particularly, relates to an electromagnetic levitation force type propulsion device which can transfer the absorption force of the electromagnets into the push-pull force. The electromagnetic levitation force type propulsion device of the present invention can provide welding force for resistance welding equipment, provide impact force for bullet firing mechanism, and provide brake force for an intelligent emergency brake system of a vehicle.

BACKGROUND

It is well known that, a sucker cup type electromagnet can apply a very strong electromagnetic absorption force to a ferromagnetic. The electromagnetic absorption force has the characteristics of rapid response and short absorption distance. Consequently, the electromagnets are widely used in various kinds of electromagnet cranes, solenoid switches and magnetic devices for use in industrial fixture. At present, electromagnet propulsion devices generally use the pull force of electromagnets. There is no propulsion structure which can transfer the strong electromagnetic absorption force into push force. In view of the foregoing, the present invention provides an electromagnetic levitation force type propulsion device which can transfer the strong electromagnetic absorption force into push force.

The inventors of the present invention notice that, conventional resistance welding equipment having a large pressure and a short trip generally needs thousands of electrode force. Conventional resistance welding equipment generally uses steam power as power source, which needs a large and heavy air compressor. The electromagnetic levitation force type propulsion device of the present invention can provide a new type of power source for the resistance welding equipment due to the strong electromagnetic absorption force of the electromagnet to the ferromagnetic or electromagnet.

The inventors of the present invention notice that, conventional brake system of a vehicle cannot realize intelligent emergency brake. If the electromagnetic levitation force type propulsion device of the present invention can be used in a brake system, the safety performance of the vehicle can be improved remarkably because the brake system is controlled via electric signal which has the characteristics of rapid response and short absorption distance.

The inventors of the present invention also notice that, conventional bullet firing mechanism uses mechanical switch which can pull the trigger via a compression spring. If electromagnetic levitation force of the present invention can be used as the power source, the firing of the bullet can be realized via electric signal switch or remote switch. The structure of the bullet firing mechanism can be simplified and the bullet firing mechanism can be used more safely and stably.

In view of the foregoing, what is needed, therefore, is to provide a new type of electromagnetic levitation force type propulsion device.

SUMMARY

It should be noticed that, the term "electromagnetic absorption force" in the present invention refers to a force an electrified electromagnet applies to another electromagnet or a ferromagnetic in a certain distance. The term "levitation" refers to a state in which the electromagnetic absorption force of the electromagnet absorbs another electromagnet or a ferromagnetic but does not contact with the electromagnet or the ferromagnetic. The term "electromagnetic levitation force" refers to the electromagnetic absorption force between an electromagnet or ferromagnetic in a levitation state and an electromagnet.

One objective of the present invention is to provide an electromagnetic levitation force type propulsion device which can provide power for a resistance welding equipment, a bullet firing mechanism and an intelligent emergency brake system of a vehicle.

According to one embodiment of the present invention, an electromagnetic levitation force type propulsion device includes:

an integrated electromagnet structure, comprising: a mounting frame, a propulsion outputting shaft capable of moving back and forth with respect to the mounting frame and extending out of the mounting frame, and two electromagnets opposite to each other, with one of the two electromagnets being assembled to one side of the mounting frame to form a stationary electromagnet and the other electromagnet being fastened to the propulsion outputting shaft to form a movable electromagnet, and the movable electromagnet being provided at the other side of the mounting frame via the propulsion outputting shaft and capable of moving back and forth with respect to the stationary electromagnet;

an auxiliary propulsion structure, configured to drive the movable electromagnet back and forth with respect to the stationary electromagnet; and a power supply control structure, configured to provide a power supply for the integrated electromagnet structure and/or the auxiliary propulsion structure.

According to one aspect of the present invention, the two electromagnets are two suction cup type electromagnets opposite to each other, or a ferromagnetic and a suction cup type electromagnet opposite to each other.

According to one aspect of the present invention, the propulsion outputting shaft comprises a positioning end and a projecting end, the projecting end is slidably coupled to one side of the mounting frame and extends out of the mounting frame, the positioning end is slidably coupled to the other side of the mounting frame, the projecting end acts as a propulsion outputting end which can be directly or indirectly acts on a power receiving unit or can be directly or indirectly connected to a power receiving unit.

According to one aspect of the present invention, the mounting frame comprises a mounting carrier having a cylinder shape, or a slide column shape, or a frame shape, or a trapezoid shape, or a groove shape, or an L shape.

According to one aspect of the present invention, the power supply control structure comprises a power supply for the electromagnet, a power supply for the auxiliary propulsion structure, a power control circuit, a current control display circuit, a password circuit, a remote control circuit and a corresponding remote switch, an automatic switch and a control switch.

According to one aspect of the present invention, the auxiliary propulsion structure is a propulsion structure being capable of driving the propulsion outputting shaft to move back and forth relative to the mounting frame, comprising an artificial power structure, a steam power structure, a motor power structure, a hydraulic pressure structure, an electromagnetic absorption force structure, a spring force structure, or a counterforce structure.

According to one aspect of the present invention, the auxiliary propulsion structure is a cylinder connected with the propulsion outputting shaft, and the cylinder can drive the propulsion outputting shaft to move back and forth relative to the mounting frame.

According to one aspect of the present invention, the auxiliary propulsion structure is an auxiliary electromagnet connected to the propulsion outputting shaft, the auxiliary electromagnet can drive the propulsion outputting shaft to move back and forth with respect to the mounting frame via the electromagnetic force.

According to one aspect of the present invention, a distance between two adsorption surfaces of the two opposite electromagnets is L1, $0<L1\le 5$ mm.

According to one embodiment of the present invention, a resistance welding equipment includes a power receiving unit and an electromagnetic levitation force type propulsion device as previously described, wherein the propulsion outputting shaft is connected to the power receiving unit of the resistance welding equipment, so as to provide welding force for the resistance welding equipment.

According to one embodiment of the present invention, a bullet firing mechanism includes a fuse recess acting as a force receiving unit of the bullet firing mechanism and an electromagnetic levitation force type propulsion device as previously described, wherein the propulsion outputting shaft of the electromagnetic levitation force type propulsion device acts on the fuse recess of the bullet firing mechanism, so as to provide an impact force for firing the bullet.

According to one embodiment of the present invention, an intelligent emergency brake system of a vehicle, comprising: a speed monitoring device, a remote location device, an electromagnetic levitation force type propulsion device as claimed in claim 1 and an intelligent control device being electrically connected to each other and cooperating with each other, when the vehicle is traveling, if the speed monitoring device determines the speed of the vehicle reaches a predetermined speed, the remote location device is connected via the intelligent control device; when the remote location device determines an obstacle or obstacles is within a predetermined distance, the electromagnetic levitation force type propulsion device is connected via the intelligent control device, so that a brake tile on the propulsion outputting end of the electromagnetic levitation force type propulsion device resists a transmission structure of the vehicle, so as to realize emergency brake; if the speed monitoring determines the vehicle speed is zero, the brake tile of the electromagnetic levitation force type propulsion device is released via the intelligent control device, so that the vehicle can return to a normal running state.

According to one aspect of the present invention, the intelligent control device comprises a control program for controlling moving forward of the vehicle, the control program for controlling moving forward of the vehicle comprising:

collecting an electric signal relating speed of the vehicle preset in the speed monitoring device, instructing the remote location device to work if the speed reaches a predetermined value, and instructing the remote location device to stop working if the speed is less than the predetermined value;

collecting an electric signal relating a distance of an obstacle preset in the remote location device, instructing the electromagnetic levitation force type propulsion device to start to work if the distance of the obstacle is within a predetermined distance; and collecting a speed signal of the speed monitoring device, and instructing the electromagnetic levitation force type propulsion device to stop working if the speed is zero.

According to one aspect of the present invention, the electromagnetic levitation force type propulsion device is equipped with an independent manual power switch.

According to one aspect of the present invention, the intelligent emergency braking system of a vehicle comprises an intelligent emergency brake system for moving the vehicle forward and an intelligent emergency brake system for moving the vehicle backward.

According to one aspect of the present invention, the intelligent emergency brake system for moving the vehicle backward comprises a speed monitoring device, a remote location device, an electromagnetic levitation force type propulsion device and an intelligent control device being electrically connected to each other and cooperating with each other on the vehicle, wherein when moving the vehicle backward, if the speed monitoring device detects an obstacle is located within a predetermined distance, the electromagnetic levitation force type propulsion device is connected via the intelligent control device and a brake tile on a propulsion outputting end of the electromagnetic levitation force type propulsion device resists a transmission structure of the vehicle, so as to realize emergency brake; when the speed monitoring device detects the vehicle speed is zero, the brake tile on the electromagnetic levitation force type propulsion device is released via the intelligent control device, so that the vehicle return to a normal running state.

According to one aspect of the present invention, the intelligent control device comprises a control program for moving the vehicle backward, and the control program for moving the vehicle backward comprising:

collecting an electric signal for moving the vehicle backward, if the electric signal for moving the vehicle backward being collected, entering the control program for moving the vehicle backward;

instructing the electromagnetic levitation force type propulsion device to start to work if the distance collected by the remote distance device being within a predetermined distance; and collecting a speed signal of the speed monitoring device, and instructing the electromagnetic levitation force type propulsion device to stop working if the vehicle speed is zero.

Compared with prior art, the electromagnetic levitation force type propulsion device of the present invention is controlled by electric signal and has rapid response and short trip and, therefore, can be used in various equipments, especially the resistance welding equipments, brake systems and bullet firing mechanisms. The electromagnetic levitation force type propulsion device of the present invention not only has simple structure, convenient operation, rapid response, safety and endurance, but also causes no noise, no pollution. The electromagnetic levitation force type propulsion device of the present invention has environment-friendly and energy-efficient properties and, therefore, is one kind of completely new propulsion device.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION

The present invention is aimed to generating strong electromagnetic levitation force and outputting the electromagnetic levitation force as a power source of a propulsion device. The inventors of the present invention notice that the electromagnetic absorption force has the following characteristics, strong adsorption force, short adsorption distance, and rapid response to cut-off or switch on of power. In view of the foregoing, the present invention provides an electromagnetic levitation force type propulsion device which can be widely used as power sources of various kinds of devices, such as a resistance welding equipment, a bullet firing mechanism, and an intelligent emergency brake system of a vehicle.

At first, the present invention defines two concepts, i.e. ordinary trip of an electromagnetic levitation force type propulsion device and small trip of an electromagnetic levitation force type propulsion device.

Figure 3:
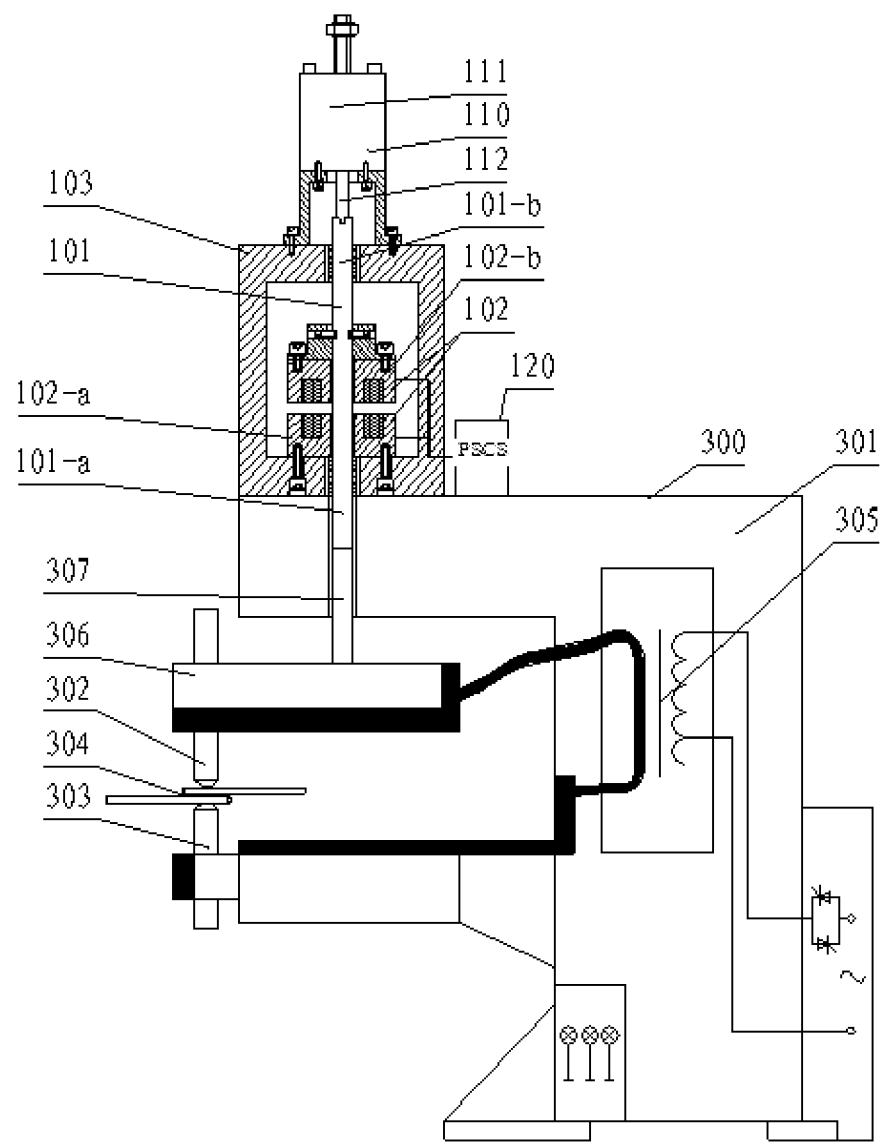
FIG. 3 depicts an exemplary view of resistance welding equipment having the electromagnetic levitation force type propulsion device of the present invention.

Ordinary trip in the present invention indicates that the two electromagnets have large power. The moveable electromagnet fastened to the mounting frame has a long trip, for example no less than 50 mm. In this case, a big auxiliary propulsion structure is needed, as shown in FIGS. 1 and 3.

Figure 2:
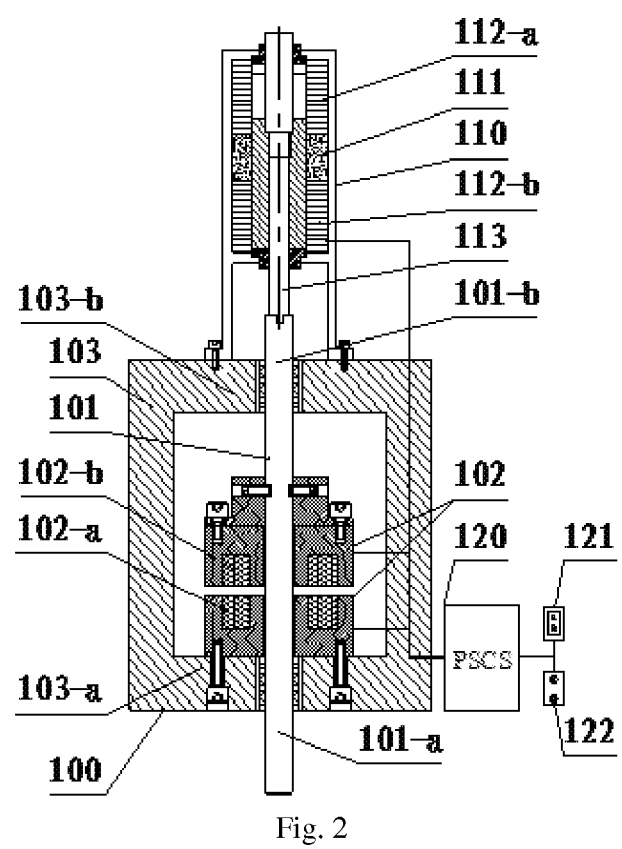
FIG. 2 depicts an exemplary view of an electromagnetic levitation force type propulsion device which has a short trip.
Figure 4:
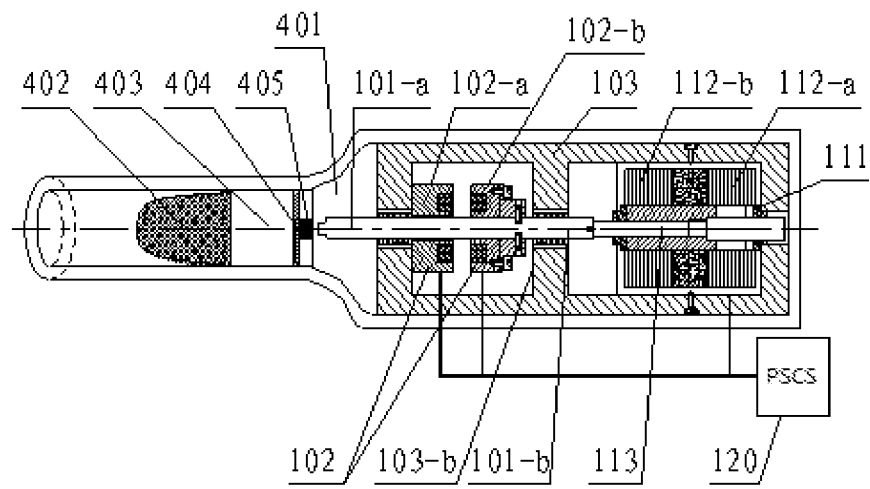
FIG. 4 depicts an exemplary view of a bullet firing mechanism having the electromagnetic levitation force type propulsion device of the present invention.

Small trip in the present invention indicates that the two electromagnets have small power. The moveable electromagnet fastened to the mounting frame has a short trip, such as less than 50 mm. In this case, no big auxiliary propulsion structure is needed, as shown in FIGS. 2 and 4.

Figure 1:
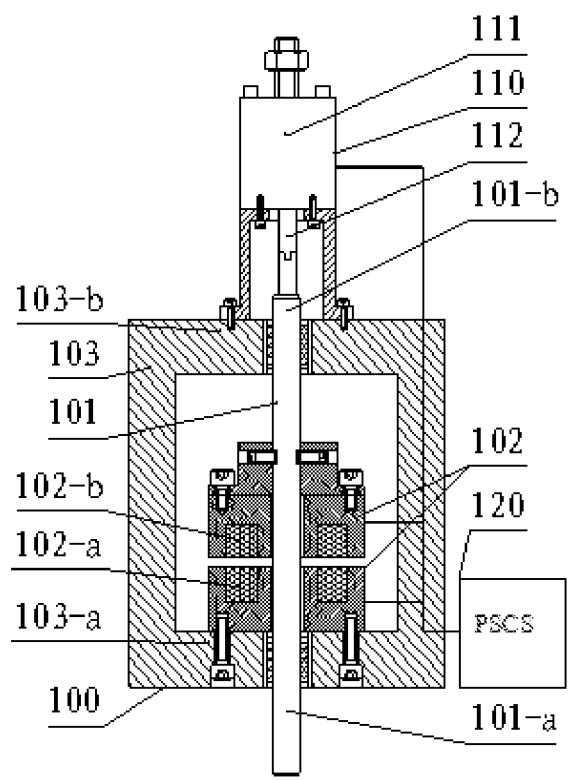
FIG. 1 depicts an exemplary view of an electromagnetic levitation force type propulsion device which has an ordinary trip.

Referring to FIG. 1, the electromagnetic levitation force type propulsion device according to the present invention includes an integrated electromagnet structure 100, an auxiliary propulsion structure 110 and a power supply control structure 120 (PSCS 120). The integrated electromagnet structure 100 includes a propulsion outputting shaft 101, two electromagnets 102 opposite to each other, and a mounting frame 103. One of the two electromagnets 102 is fastened to a lower side 103-*a* of the mounting frame 103, to form a stationary electromagnet 102-*a*. The other electromagnet 102 is coupled to the propulsion outputting shaft 101, so as to form a moveable electromagnet 102-*b*. The propulsion outputting shaft 101 extends through the stationary electromagnet 102-*a* as well as the moveable electromagnet 102-*b* in turn. The propulsion outputting shaft 101 includes a projecting end 101-*a* and a positioning end 101-*b*. The positioning end 101-*b* is slidably assembled to a top side 103-*b* of the mounting frame 103. The projecting end 101-*a* extends through the stationary electromagnet 102-*a* and the mounting frame 103 and extends out of the lower side 103-*a* of the mounting frame 103. The projecting end 101-*a* functions as the propulsion outputting end of the electromagnetic levitation force type propulsion device of the present invention, which can be directly or indirectly acts on a power receiving unit, or can be connected to a power receiving unit of a mechanic equipment.

It should be understood that, the two electromagnets 102 can be two suction cup type electromagnets, or can be a suction cup type electromagnet and a ferromagnetic. After electrified, electromagnetic force is generated between the electromagnet and the ferromagnetic, to absorb the electromagnet and the ferromagnetic to each other. In use, according to actual requirement, position of the electromagnet and the ferromagnetic can be changed. In the embodiment as illustrated, the two electromagnets 102 are two suction cup type electromagnets opposite to each other. When the absorption surfaces of the two electromagnets face each other, the electromagnetic absorption force, the electromagnetic levitation force and the absorption distance of the electromagnet increase in multiples.

Each suction cup type electromagnet has a shape of circular disc, or square plate, or bar. The suction cup type electromagnet can define a through hole at a center thereof or does not define a through hole at a center thereof. The propulsion outputting shaft has a structure corresponding to the structure of the suction cup type electromagnet. In the embodiment as illustrated, the two suction cup type electromagnets each have a circular plate shape and define a through hole at a center thereof. The propulsion outputting shaft 101 has a simple structure. The propulsion outputting shaft 101 is a cylinder extending through the two suction cup type electromagnets 102-*a*, 102-*b* and the mounting frame 103. One end of the propulsion outputting shaft 101 is the positioning end 101-*b*, and the other end of the propulsion outputting shaft 101 is the propulsion outputting end 101-*a*.

It should be understood that, in the illustrated embodiment, the moveable electromagnet 102-*b* is fastened to the propulsion outputting shaft 101. The propulsion outputting shaft 101 can drive the movable electromagnet 102-*b* to move back and forth relative to the mounting frame 103 via the positioning end 101-*b*. The electromagnetic levitation force can be outputted via the projecting end 101-*a*.

The structure and function of the mounting frame 103 is detailed as following. The propulsion outputting shaft 101 extending through the two electromagnets 102-*a*, 102-*b* needs to be assembled on a carrier. The mounting frame 103 can act as the carrier. One electromagnet 102 is assembled to one side of the mounting frame 103 to form a stationary electromagnet 102-*a*, and the other electromagnet 102 is fastened to the propulsion outputting shaft 101 in a slide manner to form a movable electromagnet 102-*b*. Via changing position relationship of the stationary electromagnet 102-*a* and the movable electromagnet 102-*b*, the electromagnetic levitation force between the two electromagnets 102 can be generated, output or maintained. When the power source of the two electromagnets 102 is cut off, the electromagnetic levitation force will disappear, so as to enters a next work cycle.

The mounting frame 103 can have a cylinder shape, or a slide column shape, or a frame shape, or a trapezoid shape, or a groove shape, or an L shape. The stationary electromagnet 102-a can be mounted on the mounting frame 103.

The auxiliary propulsion structure 110 can be various kinds of structures which can drive the moveable electromagnet 102-b move back and forth in the mounting frame 103. According to one embodiment of the present invention, the auxiliary propulsion structure 110 can be an artificial power structure, a steam power structure, a motor power structure, a hydraulic pressure structure, an electromagnetic absorption force structure, a spring force structure, or a counterforce structure.

In the illustrated embodiment, the auxiliary propulsion structure 110 is a small cylinder 111 mounted on the top side 103-b of the mounting frame 3. A connecting end 112 of the small cylinder 111 is connected to the positioning end 101-b of the propulsion outputting shaft 101. The small cylinder 111 can drive the moveable electromagnet 102-b to move back and forth in the mounting frame 103.

The power supply control structure 120 can be assembled on the mounting frame 3 or other suitable places. The power supply control structure 120 is electrically connected to the stationary electromagnet 102-a, the movable electromagnet 102-b and the small cylinder 111 of the auxiliary propulsion structure 110 respectively. According to one embodiment of the present invention, the power supply control structure 120 includes a power supply for the electromagnet, a power supply for the auxiliary propulsion structure, a power control circuit, a password circuit, a remote control circuit, a current control display circuit and a corresponding remote switch, a remote switch and a regulator control switch. When the small cylinder 111 drives the moveable electromagnet 102-b to move back and forth in the mounting frame 103, the power supply control structure 120 controls cut-off or switch-on of the power and adjust the current to generate and output the electromagnetic levitation force, so as to generate and adjust the electromagnetic levitation force.

To better understand the electromagnetic levitation force of the present invention and the relationship between the electromagnetic levitation force and the distance, tests have been carried on the electromagnetic levitation force type propulsion device of the present invention, wherein the two electromagnets are two 16050 suction cup type electromagnets of Zhongshan Landa Solenoid Co., Ltd., having a power of 45 w and an electromagnetic absorption force of 4000N, and the tensile tester is CN76104 computer-controlled electronic universal testing machine of Shenzhen New Sans Materials Testing Co., Ltd.

Testing Method

A stainless steel plate which does not conduct magnet is set on the propulsion outputting end of the electromagnetic levitation force type propulsion device according to the present invention. When the distance between the two electromagnets opposite to each other is zero, the stainless steel plate contacts the propulsion outputting end. In this case, the tensile of the stainless steel plate is zero. The thickness of the stainless steel plate is changed as well as the two electromagnets opposite to each other are electrified. The thickness of the stainless steel plate is adopted as the effective range of the electromagnetic levitation force. Tension of the movable electromagnet is tested via the tensile tester. The maximum peak of the tension is adopted as the electromagnetic levitation force. The test results are shown in Table 1.

TABLE 1

| Thickness of steel plate (mm) | 0 | 0.5 | 1.0 | 1.5 | 2.0 | 2.5 | 3.0 | 3.5 | 4.0 |
|---|---|---|---|---|---|---|---|---|---|
| Peak of the tension (N) | 8000 | 6696.3 | 4408.2 | 3257.8 | 2223.1 | 1667.0 | 1274.7 | 978.3 | 790.8 |
| Steel plate thickness (mm) | 4.5 | 5.0 | 5.5 | 6.0 | 7.0 | 8.0 | 9.0 | 10.0 | — |
| Peak of the tension (N) | 650.6 | 537.7 | 476.9 | 413.3 | 360.9 | 270.1 | 231.0 | 198.4 | — |

According to the test results as shown in the Table 1, although two electromagnets having high power opposite to each other are used, the actual distance L in which the electromagnetic levitation force can be tested is still very short, such as less than 10 mm. The distance which can be actually used (effective absorption distance) L1 is even shorter, generally less than 5 mm. According to the test results as presented in Table 1, the amount of the electromagnetic levitation force is inversely proportional to the absorption distance. In other words, the shorter the distance is, the stronger the electromagnetic levitation force is. However, when the distance is zero, the force of the propulsion outputting end is blocked by the stationary electromagnet and, therefore, there is no electromagnetic levitation force. The relationship between the distance and the electromagnetic levitation force can be used to instruct how to use the electromagnetic levitation force, i.e. the effective absorption distance L1 of electromagnetic levitation force is larger than zero, and no more than 5 mm. In other words, $0<L1\leq5$ mm.

When the effective absorption distance L1 is no more than zero, the electromagnetic levitation force between the stationary electromagnet and the movable electromagnet is transferred into the electromagnetic absorption force. In this case, the force on the propulsion outputting end is zero. The electromagnetic absorption force cannot be sued in actual use. When the effective absorption distance L1 is more than 5 mm, the electromagnetic levitation force cannot be used desirably. The range of the effective absorption distance is one of the key points of the present invention which differs the present invention from the prior art.

Working process of the embodiment as shown in FIG. 1 is detailed as following. When work begins, the power supply of the small cylinder 111 is switched on, the power supplies of the two electromagnets 102-a, 102-b are cut off. The small cylinder 111 drives the movable electromagnet 102-b to a high position of the mounting frame 103. The power supply of the small cylinder 111 is cut off, the power supplies of the two electromagnets 102-a, 102-b are switched on, the movable electromagnet 102-b together with the propulsion outputting shaft 101 moves toward the stationary electromagnet 102-a. When the distance between the two electromagnets 102-a, 102-b falls in the range of the effective absorption distance, strong electromagnetic levitation force between the two electromagnets 102-a, 102-b is generated. The electromagnetic levitation force can directly or indirectly act on a force receiving unit via the propulsion outputting end 101-a. Then, the power supply of the small cylinder 111 is switched on, the power supplies of the two electromagnets 102-a, 102-b are cut off, the small cylinder 111 drives the movable electromagnet 102-b move upwardly. In this case, the electromagnetic levitation force type propulsion device enters the next work cycle.

The embodiment as shown in FIG. 1 adopts a cylinder to connect a steam power auxiliary propulsion structure, which can be used in various mechanic equipments which have large pressure and short trip. In other words, the embodiment as shown in FIG. 1 can be used in an electromagnetic levitation force type propulsion device which has two high power electromagnets and moves back and forth in a mounting frame with a long trip. The embodiment as shown in FIG. 1 can be used as a power source of a resistance welding equipment. Further, the present invention also provides an electromagnetic levitation force type propulsion device which has two low power electromagnets and has a trip back and forth in a mounting frame less than 50 mm, as shown in FIG. 2.

Referring to FIG. 2, an electromagnetic levitation force type propulsion device according to another embodiment of the present invention includes an integrated electromagnet structure 100, an auxiliary propulsion structure 110 and a power supply control structure 120, wherein the integrated electromagnet structure 100 includes a propulsion outputting shaft 101, two electromagnets 102 opposite to each other, and a mounting frame 103. One of the two electromagnets 102 is fastened to a lower side 103-a of the mounting frame 103, so as to form a stationary electromagnet 102-a. The other electromagnet 102 is coupled to the propulsion outputting shaft 101, so as to form a moveable electromagnet 102-b. The propulsion outputting shaft 101 successively extends through the stationary electromagnet 102-a and the moveable electromagnet 102-b. The propulsion outputting shaft 101 includes a projecting end 101-a and a positioning end 101-b. The positioning end 101-b is slidably assembled to a top side 103-b of the mounting frame 103. The projecting end 101-a extends through the stationary electromagnet 102-a and the mounting frame 103 in a slide manner and extends out of the lower side 103-a of the mounting frame 103. The projecting end 101-a acts as the propulsion outputting end of the electromagnetic levitation force type propulsion device of the present invention. The projecting end 101-a can directly or indirectly acts on a power receiving unit, or can be connected to a power receiving unit of a mechanic equipment.

The auxiliary propulsion structure 110 of the electromagnetic levitation force type propulsion device as shown in FIG. 2 is an auxiliary electromagnet 111. The auxiliary electromagnet 111 includes a solenoid coil 112-a, a solenoid coil 112-b and a moveable iron core 113. The working process of the auxiliary electromagnet 111 is detailed as following: the solenoid coil 112-a is electrified, the current of the solenoid coil 112-b is cut off, and the moveable iron core 113 is drawn back. The current of the solenoid coil 112-a is cut off, the solenoid coil 112-b is electrified, and the moveable iron core 113 is push outwardly. The auxiliary electromagnet 111 is mounted on the top side 103-b of the mounting frame 103, so that the solenoid coil 112-a is positioned at a distal end of the moveable iron core 113, the solenoid coil 112-b is positioned at a proximal end of the moveable iron core 113, and the moveable iron core 113 is connected to the positioning end 101-b of the propulsion outputting shaft 101.

The power supply control structure 120 is electrically connected to the two electromagnets 102-a, 102-b of the integrated electromagnet structure 100 and the auxiliary electromagnet 111 of the auxiliary propulsion structure 110 respectively. In addition, a switch 121, or a password circuit, or a remote control circuit, or a remote switch 122 is also provided in the circuit.

When the work begins, the switch 121 or the remote switch 122 switches on the power of the solenoid coil 112-a, cuts off the power of the moveable iron core 112-b as well as the power of the two electromagnets 102-a, 102-b. The auxiliary electromagnet 111 generates electromagnetic absorption force which can draw back the moveable iron core 113, as well as drive the moveable iron core 113 to move toward the auxiliary electromagnet 111. Then, the power of the solenoid coil 112-a is cut off, the power of the solenoid coil 112-b and the two electromagnets 102-a, 102-b is switched on, the moveable iron core 113 drives the moveable electromagnet 102-b to move toward the stationary electromagnet 102-a. When the moveable electromagnet 102-b is in the range of the effective absorption distance, an electromagnetic levitation force is generated between the two electromagnets 102-a, 102-b. The electromagnetic levitation force can directly or indirectly applied to a force receiving unit via the projecting end 101-a of the propulsion outputting shaft 101. Then, the power of the solenoid coil 112-a is switched on, the power of the solenoid coil 112-b and the two electromagnets 102-a, 102-b is cut off, and the electromagnetic levitation force type propulsion device enters the next work cycle.

In the embodiment as illustrated in FIG. 2, the power of the two electromagnets is low and the back and forth trip in the mounting frame is short. Therefore, the electromagnetic levitation force type propulsion device as shown in FIG. 2 can be used as power source in bullet firing mechanism, or as power source in microscopic welding.

The electromagnetic levitation force type propulsion device according to the present invention is controlled by electric signal and has rapid response and short trip. Therefore, the electromagnetic levitation force type propulsion device according to the present invention can be used in resistance welding equipment (shown in FIG. 3), bullet firing mechanism (shown in FIG. 4) and intelligent emergency brake system of a vehicle (shown in FIG. 5).

Structure, working process and operation principle of a resistance welding equipment which adopts the electromagnetic levitation force type propulsion device of the present invention as power source is detailed as following in view of FIG. 3.

Referring to FIG. 3, the resistance welding machine 300 includes a main body 301, an upper electrode 302, a lower electrode 303, a work piece 304 to be welded, a transformer 305, a clamping head 306 for clamping the upper electrode 302, and an electrode clamping head shaft 307.

The upper electrode 302 and the lower electrode 303 are connected to the transformer 305, respectively. The electrode clamping head shaft 307 which acts as the force receiving unit of the pressing mechanism is formed on the clamping head 306 for the upper electrode 302. The electrode clamping head shaft 307 is connected to the propulsion outputting end (projecting end 101-a) of the electromagnetic levitation force type propulsion device, to provide welding force for the welding machine. The electromagnetic levitation force type propulsion device which acts as the pressing mechanism is formed on a top side of the main body 301, i.e. where the former pressing mechanism cylinder is assembled. In other words, the electromagnetic levitation force type propulsion device of the present invention replaces the former air compressor and the cylinder.

In the embodiment illustrated in FIG. 3, the stationary electromagnet 102-*a* and the movable electromagnet 102-*b* of the electromagnetic levitation force type propulsion device of the present invention are two cylindrical suction cup type electromagnets opposite to each other, each having a size of Φ180×50 mm and a power of 45 W. The power supply control structure 120 is electrically connected to the stationary electromagnet 102-*a* and the movable electromagnet 102-*b*, respectively. The propulsion outputting shaft 101 extending through the stationary electromagnet 102-*a* and the movable electromagnet 102-*b* has a diameter of Φ15 mm. The auxiliary propulsion structure 110 is a small cylinder 111. A moveable shaft 112 of the cylinder 111 is connected to the positioning end 101-*b* of the propulsion outputting shaft 101, so as to provide a force which can drive the movable electromagnet 102-*b* to move back and forth in the mounting frame 103.

Since the effective absorption distance L1 is very short, in the illustrated embodiment, the distance between the two electrodes 202, 203 and the work piece 204 to be welded is set as zero. The distance L1 between the absorption surfaces of the two electromagnets opposite to each is set as 0<L1≤5 mm, so as to ensure the trip of the electrode force and obtain a desirable electrode force. According to the test results, in the range of the above effective absorption distance, the electrode force obtained by the electromagnetic levitation force can reach 6000N. Therefore, as a power resource, the electromagnetic levitation force type propulsion device of the present invention can replace the big and heavy air compressor in the conventional resistance welding equipment.

The small cylinder 111 of the auxiliary propulsion structure 110 is used to drive the movable electromagnet 102-*b* to move back and forth in the mounting frame 103. In the present embodiment, the movable electromagnet 102-*b* is about 5 kg. On the contrary, the conventional welding device must be equipped with a big and heavy air compressor to obtain an electrode force of 6000N. In other words, the auxiliary propulsion structure according to the present invention is much more simple and compact.

In the embodiment as shown in FIG. 3, the power supply control structure 120 is electrically connected to the stationary electromagnet 102-*a*, the auxiliary propulsion small cylinder 111, and the movable electromagnet 102-*b* of the electromagnetic levitation force type propulsion device respectively. The power supply control structure 120 includes a circuit which can switch on the power and delay cut off the power. When the small cylinder 111 drives the movable electromagnet 102-*b* to a highest end or a most remote end, the power of the electromagnet is switched on. When the movable electromagnet 102-*b* moves to a most low end or an end close to the stationary electromagnet 102-*a*, the power control circuit provides a delay telecommunications signal. The delay telecommunications signal maintains the action time of the electromagnetic levitation force, while does not affects the moveable electromagnet 102-*b* to enter the next cycle. The current amount control and display circuit of the power supply control structure 120 can control and display the amount of current of the electromagnets, so as to indirectly adjust the electromagnetic levitation force and meet the requirements of different equipments.

Prior to operating the resistance welding equipment as illustrated in FIG. 3, the absorption distance L1 of the electromagnetic levitation force needs to be adjusted. The distance between the electrodes 302, 303 and the work piece 304 to be welded is adjusted to a zero distance where the electrodes 302, 303 contact the work piece 304. The distance between the stationary electromagnet 102-*a* and the movable electromagnet 102-*b* is set at about 3 mm, so as to ensure the electromagnetic levitation force is in the range of the effective absorption distance L1 during welding and provide adequate electrode force in welding.

Prior to welding, the power supplies of the stationary electromagnet 102-*a* and the movable electromagnet 102-*b* are cut off, and the small cylinder 111 drives the movable electromagnet 102-*b* moves upwardly to the highest or the remotest end of the mounting frame 103. When the welding begins, the power supply control structure 120 switches on the power supply of the electromagnets, the small cylinder 111 drives the movable electromagnet 102-*b* to move downwardly. When the movable electromagnet 102-*b* moves downwardly into the range of the effective absorption distance L1 of the electromagnetic levitation force, strong electromagnetic levitation force is generated between the stationary electromagnet 102-*a* and the movable electromagnet 102-*b*. The propulsion outputting end 101 transfers the electromagnetic levitation force to the upper electrode 302 via the force receiving unit, i.e. the electrode clamping head shaft 307, to provide adequate electrode force to complete the welding operation. Then, the power supply control structure 120 automatically cuts off the power of the stationary electromagnet 102-*a* and the movable electromagnet 102-*b*. The small cylinder 111 actuates the movable electromagnet 102-*b* move upwardly to the highest position of the mounting frame 103, and the electromagnetic levitation force type propulsion device enter the next work cycle.

It should be understood that, the electromagnetic levitation force type propulsion device according to the present invention can also be assembled to a seam welder of a resistance welding equipment. In this case, the propulsion outputting end of the electromagnetic levitation force type propulsion device is connected to the force receiving unit of the pressing mechanism of the seam welder, so as to provide electrode force for the seam welding. In addition, the electromagnetic levitation force type propulsion device of the present invention can be assembled to a butt welder of a welding device. In this case, the propulsion outputting end of the electromagnetic levitation force type propulsion device is connected to a force receiving unit of the feeding mechanism of the butt welder, so as to provide upset force for the butt welding.

In actual use, the size of the two opposite electromagnets can be changed, so as to generate thousands or tens of thousands of electromagnetic levitation force. Compared with conventional resistance welding equipment which adopts big and heavy air compressor, the electromagnetic levitation force type propulsion device of the present invention can provide adequate electrode force only via small auxiliary force. According to the test results, the electromagnetic levitation force type propulsion device of the present invention not only can provide a steady pressure, but also has an energy conversion rate higher than 80%, which is much higher than the energy conversion rate of an air compressor which is generally less than 30%.

Structure, working process and operation principle of a bullet firing mechanism which uses the electromagnetic levitation force type propulsion device of the present invention as power source is detailed as following in view of FIG. 4.

The bullet firing mechanism shown in FIG. 4 includes a chamber 401, a bullet 402 and a shell 403. The sidewall of the shell 403 defines a recess 404. The rear surface of the shell 403 defines a fuse recess 405. The fuse recess 405 acts as the force receiving unit of the bullet firing mechanism. The electromagnetic levitation force type propulsion device 100 is assembled at a rear portion of the chamber 401. The propulsion outputting end of the electromagnetic levitation force type propulsion device (projecting end 101-a) is formed as a firing pin corresponding to the fuse recess 405. The projecting end 101-a of the propulsion outputting end and the fuse recess 405 are assembled along a same axis. The top side 103-a of the mounting frame 103 is fixed with an auxiliary electromagnet 111. The auxiliary electromagnet 111 includes a solenoid coil 112-a, a solenoid coil 112-b and a moveable iron core 113. The moveable iron core 113 is connected to the positioning end 101-b.

Prior to the operation of the bullet firing mechanism of the present embodiment, the two electromagnets 102 are close to the range of the effective absorption distance of the electromagnetic levitation force. When firing, the power supply control structure 120 switches on the current of the solenoid coil 112-a, cuts off the current of the solenoid coil 112-b and the two electromagnets 102. In this case, the electromagnetic absorption force of the auxiliary electromagnet 111 can drive the moveable electromagnet 102-b to the top side 103-b of the mounting frame 103. The current of the solenoid coil 112-a is cut off, the current of the solenoid coil 112-b and the two electromagnets 102 is switched on, the moveable iron core 113 actuates the moveable electromagnet 102-b to move toward the stationary electromagnet 102-a. When the moveable electromagnet 102-b is in the range of the effective absorption distance L1 of the electromagnetic levitation force, the electromagnetic levitation force drives the moveable electromagnet 102-b and the firing pin of the propulsion outputting 101-a to rapidly impact the force receiving unit, i.e. the fuse recess 405, so as to fire the bullet 402. Then, the current of the solenoid coil 112-b and the two electromagnets 102-a, 102-b is cut off, the current of the solenoid coil 112-a is switched on, the electromagnetic levitation force disappears and the moveable electromagnet 102-b is reset rapidly. In this case, the bullet firing mechanism enters the next work cycle.

The electromagnets of the bullet firing mechanism in the embodiment as shown in FIG. 4 only need small power. An electromagnet having a predetermined voltage of 12V and a power of 2 w can meet the requirement of the bullet firing mechanism. The time for impacting the bullet is very short, for instance about 0.1 second. A fully charged high capacity rechargeable battery of 10000 mAh can realize the firing of bullets for about 2 million times. Therefore, in the embodiment as shown in FIG. 4, the bullet firing mechanism is equipped with a high capacity rechargeable battery. There is no need to use a wire to connect the bullet firing mechanism with an external power supply.

The conventional bullet firing mechanism realizes the firing of the bullet via pulling the spring trigger. Anyone can use the bullet firing mechanism without limitation. The switch for operating the bullet firing mechanism having the electromagnetic levitation force type propulsion device as shown in FIG. 4 is controlled by electric signal. Various kinds of switches can be designed to control the trigger of the bullet firing mechanism, for instance the switch for triggering the bullet firing mechanism is controlled via a password circuit. In this case, the gun can only used by a particular person, which can avoid abuse of gun and enhance firearms control.

Due to Chinese law and corresponding regulations, inventors of the present invention cannot use and test the bullet firing mechanism according to the present invention in various conditions and environments. However, according to the disclosure of the present invention, better and safer bullet firing mechanism can be provided based on tests having the counterforce auxiliary propulsion and the spring force auxiliary propulsion.

Figure 5:
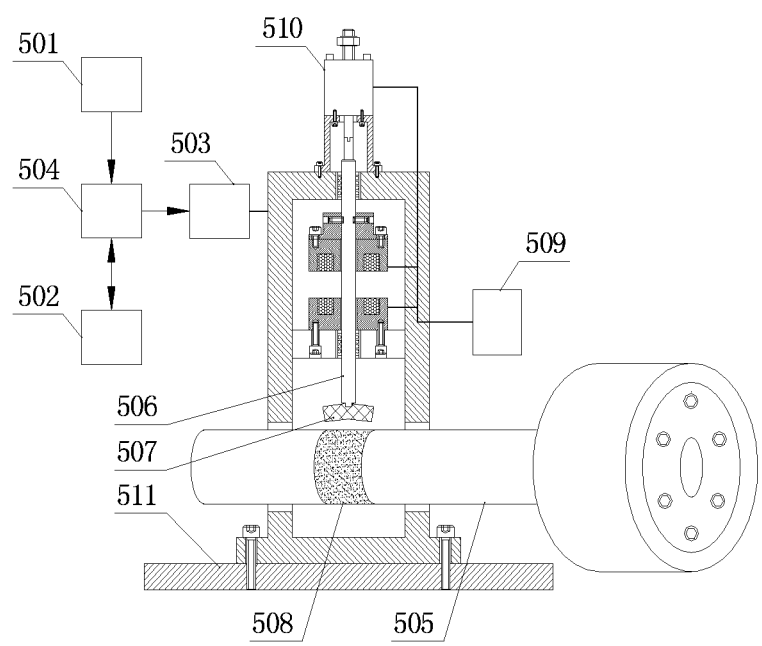
FIG. 5 depicts an exemplary view of an intelligent emergency brake system of a vehicle which adopts the electromagnetic levitation force type propulsion device of the present invention.

Structure, working process and operation principle of an intelligent emergency brake system of a vehicle which uses the electromagnetic levitation force type propulsion device of the present invention as power source is detailed as following in view of FIG. 5.

The intelligent emergency brake system of a vehicle in the present invention refers to a brake system which can realize automatic emergency brake and prevent the vehicle from hitting obstacles right before the vehicle hitting the obstacles. The intelligent emergency brake system of a vehicle according to the embodiment shown in FIG. 5 includes a speed monitoring device mounted on the vehicle, a remote location device, an electromagnetic levitation force type propulsion device and an intelligent control device being connected to each other and cooperating with each other, to realize intelligent emergency brake of the vehicle. It should be understood that, the intelligent emergency brake system of a vehicle according to the present invention can be independently assembled to a vehicle in addition to the normal brake system for slowing down the vehicle or stop the vehicle in normal use.

Referring to FIG. 5, the intelligent emergency brake system of a vehicle in accordance with one embodiment of the present invention includes a speed monitoring device 501 mounted on the vehicle, a remote location device 502, an electromagnetic levitation force type propulsion device 503 and an intelligent control device 504. The electromagnetic levitation force type propulsion device 503 is mounted on the vehicle at an appropriate position 511 close to a transmission structure 505 of the vehicle. The propulsion outputting end 506 of the electromagnetic levitation force type propulsion device 503 is formed with a brake tile 507. The brake tile 507 is corresponding to the axle 508 of the transmission structure 505. The axle 508 defines a pattern on a surface thereof, to increase the friction force in case of pressing the brake tile 507. The electromagnetic levitation force type propulsion device 503 further includes a power supply control structure 509 and an auxiliary propulsion structure 510 similar to those have been shown in FIGS. 1 and 2 and will not be further detailed here.

Working process of the intelligent emergency brake system of a vehicle is further detailed as following. When the vehicle runs normally, the speed monitoring device 501 detects the speed of the vehicle. When the speed of the vehicle reaches a predetermined value, for instance 80 km/h, the remote location device 502 is connected via the intelligent control device 504. When the vehicle runs normally, the brake tile 507 is separated from the axle 508. When the remote location device 502 detects the obstacles in a predetermined distance range, for example 5m, the electromagnetic levitation force type propulsion device 503 is connected via the intelligent control device 504. Due to the generation and outputting of the electromagnetic levitation force, the propulsion outputting end 506 drives the brake tile 507 to press and contact the axle 508, to realize emergency brake of the vehicle until the speed of the vehicle slows down to zero. Thereafter, the brake tile 507 of the electromagnetic levitation force type propulsion device 503 is released via the intelligent control device 504, the brake tile 507 separates from the axle 508. In this case, the vehicle returns to normal running state.

The operation principle of the intelligent emergency brake system of a vehicle as shown in FIG. 5 is detailed as following. The speed monitoring device, the remote location device and the intelligent control device in conventional vehicles are all displayed and controlled via electric signal. The electromagnetic levitation force type propulsion device of the present invention is controlled via electric signal, too. Therefore, the speed monitoring device, the remote location device, the intelligent control device and the electromagnetic levitation force type propulsion device according to the present invention can readily connect to each other automatically and cooperate with each other during intelligent emergency brake. The electromagnetic levitation force can respond rapidly. For instance, suppose the distance between the brake tile 507 and the axle 508 is about 10 mm. The electromagnetic levitation force type propulsion device according to the present invention can acts on the axle 508 within about 10 milliseconds via the strong electromagnetic levitation force. For a vehicle at a speed of 80 km/h, it takes about 220 milliseconds to hit an obstacle 5 meters ahead. In view of the above, the electromagnetic levitation force type propulsion device according to the present invention can realize emergency automatic brake of a vehicle and, therefore, provide a new way to realize intelligent emergency brake of a vehicle.

It should be understood that, if the electromagnetic levitation force type propulsion device 503 of the intelligent emergency brake system of a vehicle is equipped with an additional manual power switch, the electromagnetic levitation force type propulsion device 503 can be manually controlled and reset independently.

It should be understood that, a conventional vehicle can be equipped with a reversing remote location device when moving a vehicle backward. When moving a vehicle backward, the speed of the vehicle is very slow. The intelligent emergency brake system of a vehicle can readily realize intelligent emergency brake when moving a vehicle backward. In other words, the intelligent emergency brake system of a vehicle can include an intelligent emergency brake system for moving the vehicle forward and an intelligent emergency brake system for moving the vehicle backward.

The intelligent emergency brake system for moving a vehicle backward includes a speed monitoring device mounted on the vehicle, a remote location device, an electromagnetic levitation force type propulsion device and an intelligent control device. Due to different driving direction of the vehicle, an additional remote location device is needed.

Working process of an intelligent emergency brake system for moving a vehicle backward is detailed as following. When moving a vehicle backward, if the remote location device detects the distance between the obstacle and the back of the vehicle, for instance 0.3 meter, the vehicle can realize intelligent emergency brake when the electromagnetic levitation force type propulsion device is connected via the intelligent control device. When the vehicle is completely braked, the intelligent control device detects the speed of the vehicle is zero, the intelligent control device releases the brake tile of the electromagnetic levitation force type propulsion device and the vehicle returns to a normal running state. Other futures, working process and operation principle of an intelligent emergency brake system for moving a vehicle backward are almost the same as been detailed regarding the intelligent emergency brake system for moving a vehicle backward and will not be detailed further.

The structure, the working process and the operation principle of an intelligent emergency brake system of a vehicle have been detailed previously. Further details will be focused on the intelligent control device. Obviously, various kinds of signals of the speed monitoring device, the remote location device and the electromagnetic levitation force type propulsion device of the intelligent emergency brake system of a vehicle are collected and processed by the intelligent control device and instructions are sent out in the form of electric signal. In other words, the intelligent control device is a software control device. The hardware includes a speed monitoring device and a speed pre-setting device, a remote location device and a distance pre-setting device thereof, electromagnetic levitation force type propulsion device. The software control program at least includes:

Moving Forward Control Program of the Vehicle 1. collecting an electric signal relating speed of the vehicle preset in the speed monitoring device, instructing the remote location device to work if the speed reaches a predetermined value, and instructing the remote location device to stop working if the speed is less than the predetermined value;

2. collecting an electric signal relating a distance of an obstacle preset in the remote location device, instructing the electromagnetic levitation force type propulsion device to start to work if the distance of the obstacle is within a predetermined distance;

3. collecting a speed signal of the speed monitoring device, and instructing the electromagnetic levitation force type propulsion device to stop working if the speed is zero.

Moving backward control program of the vehicle 1. collecting an electric signal for moving the vehicle backward, if the electric signal for moving the vehicle backward being collected, entering the control program for moving the vehicle backward;

2. instructing the electromagnetic levitation force type propulsion device to start to work if the distance collected by the remote distance device being within a predetermined distance; and 3. collecting a speed signal of the speed monitoring device, and instructing the electromagnetic levitation force type propulsion device to stop working if the vehicle speed is zero.

In view of the foregoing, compared with the prior art, the electromagnetic levitation force type propulsion device of the present invention is controlled by electric signal and has rapid response and short trip and, therefore, can be used in various equipments, especially the resistance welding equipments, brake systems and bullet firing mechanisms. The electromagnetic levitation force type propulsion device of the present invention not only has simple structure, convenient operation, rapid response, safety and endurance, but causes no noise, no pollution. The electromagnetic levitation force type propulsion device of the present invention has environment-friendly and energy-efficient properties and, therefore, is one kind of completely new propulsion device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments, it should be appreciated that alternative embodiments without departing from the scope of the appended claims. Although specific terms are employed herein, they are used in a generic and descriptive sense only and not for purposes of limitation.

What is claimed is:

1. An electromagnetic levitation force type propulsion device, comprising:
    an integrated electromagnet structure, comprising: a mounting frame, a propulsion outputting shaft capable of moving back and forth with respect to the mounting frame and extending out of the mounting frame, and two electromagnets opposite to each other and attracting each other, with one of the two electromagnets being assembled to one side of the mounting frame to form a stationary electromagnet and the other electromagnet being fastened to the propulsion outputting shaft to form a movable electromagnet, and the movable electromagnet being provided at the other side of the mounting frame via the propulsion outputting shaft and capable of moving back and forth with respect to the stationary electromagnet;
    an auxiliary propulsion structure, configured to drive the movable electromagnet back and forth with respect to the stationary electromagnet; and
    a power supply control structure, configured to provide a power supply for the integrated electromagnet structure and/or the auxiliary propulsion structure.

2. The electromagnetic levitation force type propulsion device as claimed in claim 1, wherein the two electromagnets are two electromagnets opposite to each other, or a electromagnet and a ferromagnetic opposite to each other.

3. The electromagnetic levitation force type propulsion device as claimed in claim 1, wherein the propulsion outputting shaft comprises a positioning end and a projecting end, the projecting end is slidably coupled to one side of the mounting frame and extends out of the mounting frame, and the positioning end is slidably coupled to the other side of the mounting frame.

4. The electromagnetic levitation force type propulsion device as claimed in claim 1, wherein the power supply control structure comprises a power supply for the electromagnet, a power supply for the auxiliary propulsion structure, a power control circuit, a current control display circuit, a password circuit, a remote control circuit and a corresponding remote switch, an automatic switch and a control switch.

5. The electromagnetic levitation force type propulsion device as claimed in claim 1, wherein the auxiliary propulsion structure is a propulsion structure being capable of driving the propulsion outputting shaft to move back and forth with respect to the mounting frame, wherein the auxiliary propulsion structure is one of an artificial power structure, a steam power structure, a motor power structure, a hydraulic pressure structure, an electromagnetic absorption force structure, a spring force structure, a counterforce structure.

6. The electromagnetic levitation force type propulsion device as claimed in claim 1, wherein a distance between two adsorption surfaces of the two opposite electromagnets is L1, $0<L1\leq5$ mm.

7. An intelligent emergency brake system of a vehicle, comprising: a speed monitoring device, a remote location device, an electromagnetic levitation force type propulsion device as claimed in claim 1 and an intelligent control device, wherein the electromagnetic levitation force type propulsion device comprises a propulsion outputting end and the propulsion outputting end is provided with a brake tile, when the vehicle is traveling, if the speed monitoring device determines the speed of the vehicle reaches a predetermined speed, the remote location device is connected via the intelligent control device; when the remote location device determines an obstacle or obstacles is within a predetermined distance, the electromagnetic levitation force type propulsion device is connected via the intelligent control device, so that the brake tile on the propulsion outputting end of the electromagnetic levitation force type propulsion device resists a transmission structure of the vehicle, so as to realize emergency brake; if the speed monitoring determines the vehicle speed is zero, the brake tile of the electromagnetic levitation force type propulsion device is released via the intelligent control device, so that the vehicle can return to a normal running state.

8. The intelligent emergency brake system of a vehicle as claimed in claim 7, wherein the intelligent control device comprises a control program for controlling moving forward of the vehicle, the control program for controlling moving forward of the vehicle comprising:
    collecting an electric signal relating speed of the vehicle preset in the speed monitoring device, instructing the remote location device to work if the speed reaches a predetermined value, and instructing the remote location device to stop working if the speed is less than the predetermined value;
    collecting an electric signal relating a distance of an obstacle preset in the remote location device, instructing the electromagnetic levitation force type propulsion device to start to work if the distance of the obstacle is within a predetermined distance; and
    collecting a speed signal of the speed monitoring device, and instructing the electromagnetic levitation force type propulsion device to stop working if the speed is zero.

9. The intelligent emergency brake system of a vehicle as claimed in claim 7, wherein the electromagnetic levitation force type propulsion device is equipped with an independent manual power switch.

* * * * *